(12) United States Patent
Peterson

(10) Patent No.: US 12,202,461 B2
(45) Date of Patent: Jan. 21, 2025

(54) PAYLOAD TRANSPORT AND DELIVERY METHOD, SYSTEM AND MULTI-PLATFORM UNMANNED CARGO DELIVERY VEHICLE

(71) Applicant: William C. Peterson, Leesburg, VA (US)

(72) Inventor: William C. Peterson, Leesburg, VA (US)

(*) Notice: Subject to any disclaimer, the term of this patent is extended or adjusted under 35 U.S.C. 154(b) by 454 days.

(21) Appl. No.: 17/669,588

(22) Filed: Feb. 11, 2022

(65) Prior Publication Data

US 2022/0161777 A1    May 26, 2022
US 2023/0132365 A9    Apr. 27, 2023

Related U.S. Application Data

(62) Division of application No. 16/460,786, filed on Jul. 2, 2019.

(Continued)

(51) Int. Cl.

| | |
|---|---|
| *B60V 3/08* | (2006.01) |
| *B64C 35/00* | (2006.01) |
| *B64U 10/25* | (2023.01) |
| *B64U 30/12* | (2023.01) |
| *B64U 50/13* | (2023.01) |
| *B64U 50/19* | (2023.01) |
| *G05D 1/00* | (2024.01) |
| *G06Q 10/08* | (2023.01) |
| *B64U 30/40* | (2023.01) |

(Continued)

(52) U.S. Cl.
CPC ............... *B60V 3/08* (2013.01); *B64C 35/005* (2013.01); *B64U 10/25* (2023.01); *B64U 30/12* (2023.01); *B64U 50/13* (2023.01); *B64U 50/19* (2023.01); *G05D 1/0011* (2013.01); *G05D 1/101* (2013.01); *G06Q 10/08* (2013.01); *B64U 30/40* (2023.01); *B64U 50/30* (2023.01); *B64U 2101/60* (2023.01); *B64U 2201/20* (2023.01); *H04L 67/125* (2013.01)

(58) Field of Classification Search
CPC ...... B60V 3/08; B64C 35/005; G05D 1/0011; G05D 1/101; G06Q 10/08; H04L 67/125; B64D 27/026; B64D 27/24; B64U 30/40; B64U 50/30; B64U 30/12; B64U 50/13; B64U 50/14; B64U 50/19; B64U 2101/60; B64U 10/25; B64U 50/11; Y02T 50/60; H04W 4/40

See application file for complete search history.

(56) References Cited

U.S. PATENT DOCUMENTS

| | | |
|---|---|---|
| 5,950,559 A | 9/1999 | Klem |
| 6,158,540 A | 12/2000 | Rice et al. |
| (Continued) | | |

*Primary Examiner* — Tyler J Lee
(74) *Attorney, Agent, or Firm* — Charles W Peterson, Jr.

(57) ABSTRACT

A method of transporting cargo, a cargo transport system and an unmanned Wing In Ground Effect vessel (UWIG) for transporting the cargo. A wake up signal indicates assignment of a new delivery. The UWIG begins pre-flight, causes cargo to be transported to the UWIG, and causes the cargo loaded into UWIG storage compartments. Once loaded and the loaded UWIG is ready, the UWIG taxis, e.g., to the open sea. Environmentally sealed PAR thrust fans provide PAR thrust during takeoff. The UWIG flies to a delivery location where cargo is unloaded, and may be stored.

3 Claims, 8 Drawing Sheets

Related U.S. Application Data

(60) Provisional application No. 62/693,715, filed on Jul. 3, 2018.

(51) Int. Cl.
   *B64U 50/30* (2023.01)
   *B64U 101/60* (2023.01)
   *H04L 67/125* (2022.01)

(56) References Cited

U.S. PATENT DOCUMENTS

| | | |
|---|---|---|
| 6,167,829 B1 | 1/2001 | Lang |
| 6,325,011 B1 | 12/2001 | Klem |
| 6,439,148 B1 | 8/2002 | Lang |
| 10,233,021 B1* | 3/2019 | Brady .............. G06Q 10/0832 |
| 10,310,500 B1* | 6/2019 | Brady .............. G07C 9/00182 |
| 10,514,690 B1* | 12/2019 | Siegel .............. G05D 1/0027 |
| 10,577,180 B1* | 3/2020 | Mehta .............. B07C 5/36 |
| 10,613,533 B1* | 4/2020 | Payson .............. G05D 1/0088 |
| 10,730,621 B2* | 8/2020 | Goovaerts .......... G06Q 10/083 |
| 2003/0066471 A1 | 4/2003 | Shin et al. |
| 2003/0101950 A1 | 6/2003 | Bortone |
| 2003/0140834 A1 | 7/2003 | DeMarco |
| 2004/0050602 A1 | 3/2004 | Jones |
| 2004/0065246 A1 | 4/2004 | Allen |
| 2004/0244633 A1 | 12/2004 | Witmer |
| 2006/0157017 A1 | 7/2006 | Bortone |
| 2007/0210953 A1 | 9/2007 | Abraham et al. |
| 2007/0245943 A1 | 10/2007 | Rice |
| 2007/0272795 A1 | 11/2007 | Ellnor |
| 2009/0152391 A1 | 6/2009 | McWhirk |
| 2010/0268517 A1 | 10/2010 | Calmels |
| 2011/0192663 A1 | 8/2011 | Kang et al. |
| 2012/0090011 A1* | 4/2012 | Ezaki .............. H04N 21/26291 725/76 |
| 2013/0068879 A1 | 3/2013 | Colting |
| 2013/0203305 A1 | 8/2013 | Lee |
| 2014/0097621 A1 | 4/2014 | Kassianoff |
| 2016/0083060 A1 | 3/2016 | Kassianoff |
| 2017/0233076 A1 | 8/2017 | Grossman |
| 2017/0351255 A1* | 12/2017 | Anderson .......... G01C 21/3453 |
| 2017/0369162 A1* | 12/2017 | Alzahrani .............. B64C 25/22 |
| 2018/0089622 A1* | 3/2018 | Burch, V .............. G05D 1/0094 |
| 2018/0137454 A1* | 5/2018 | Kulkarni .............. G05D 1/102 |
| 2018/0181126 A1* | 6/2018 | Seaman .......... G06Q 10/08355 |
| 2018/0308069 A1 | 10/2018 | Starks |
| 2019/0066041 A1* | 2/2019 | Hance .............. B65G 1/137 |
| 2019/0135433 A1* | 5/2019 | Goovaerts .............. A47G 29/14 |
| 2020/0130510 A1* | 4/2020 | Eck .............. B60L 53/14 |
| 2020/0207250 A1* | 7/2020 | Jarvis .............. G01C 21/3623 |

* cited by examiner

PAYLOAD TRANSPORT AND DELIVERY METHOD, SYSTEM AND MULTI-PLATFORM UNMANNED CARGO DELIVERY VEHICLE

CROSS REFERENCE TO RELATED APPLICATION

The present application is related to U.S. Patent Application No. 2022/0024584, Ser. No. 17/490,942, "MULTI-PLATFORM UNMANNED CARGO DELIVERY VEHICLE," to William C. Peterson, filed Sep. 30, 2021. Further the present application is a Divisional of published U.S. Patent Application No. 2020/0010071, Ser. No. 16/460,786, "PAYLOAD TRANSPORT AND DELIVERY METHOD, SYSTEM AND MULTI-PLATFORM UNMANNED CARGO DELIVERY VEHICLE," to JACOB M. BRANCATO et al., filed Jul. 2, 2019, and claims benefit to provisional U.S. Application Ser. No. 62/693,715, "WING-IN-GROUND-EFFECT (WIG) CRAFT," filed Jul. 3, 2018, and both incorporated herein by reference.

BACKGROUND OF THE INVENTION

Field of the Invention

The present invention is related to a cargo transport and delivery method, system and autonomous multi-platform unmanned delivery vehicle for the system, and more particularly, to transporting and delivering cargo with an unmanned Wing In Ground Effect (WIG) craft or vessel that may be autonomous or semi-autonomous.

Background Description

Overseas shipping is big business. Enormous cargo ships continually traverse shipping lanes in international waterways, carrying large shipments of goods enclosed in containers the size of railroad cars to distant destinations that take days to reach. Each container can hold a portion of a much larger shipment, can contain a single smaller shipment, or include a collection of smaller shipments. Frequently, shipping an order that does not fill a container means that the order may wait on the dock for enough other small orders to fill the container. So it can easily take weeks from the shipping date for an order to arrive at its destination. Typically, someone shipping a small shipment may be unwilling to wait days or weeks. Also, some cargo, such as food or other perishables, may not survive an extended shipping time.

Alternately, airfreight is available for timely shipping smaller shipments. Typically, ground transport carries parcels to/from airports where a fleet of aircraft transport cargo between the airports. While international airfreight may be a reasonable solution for letters and even for small packages, the cost may be excessive for larger shipments, shipments that may be a relatively small portion of a shipping container. DHL, for example, applies a fixed surcharge to every piece, including a pallet, that exceeds the scale weight of 150 lb (70 kg) or with a single dimension in excess of 48 in (120 cm). Further, DHL does not accept shipping pieces, skids or pallets with an actual weight that exceeds 660 lb (300 kg) or a size that exceeds 118 in (300 cm) in length, width or height. Thus, shipping medium sized shipments may require choosing between a seagoing shipper with a moderate shipping cost and a long lead time, or by air with a shorter delivery time, e.g., overnight, in exchange for paying a premium shipping rate.

For both air and sea shipping, in addition to exposure to property loss from a potential maritime disaster, there is a potential for a loss of life. A ship that sinks at sea may suffer the loss of the entire crew. Likewise a cargo plane typically has a pilot and copilot. A cargo plane that goes down at sea may suffer the loss of one or both of the pilot and copilot.

Thus, there is a need for an efficient, flexible approach to shipping, and especially for medium sized shipments, and especially, without the potential of loss of crew.

SUMMARY OF THE INVENTION

A feature of the invention is a system for medium range shipping;

Another feature of the invention is a system for medium range overseas shipping for medium sized shipments;

Yet another feature of the invention is a system for medium range shipping that is free of any potential for loss of on-board human life;

Yet another feature of the invention is a system for medium range overseas shipping medium sized shipments without the potential for loss of on-board human life.

The present invention relates to a method of transporting cargo, a cargo transport system and an Unmanned Wing In Ground Effect vessel (UWIG) for transporting the cargo. A wake up signal indicates assignment of a new delivery. The UWIG begins pre-flight, causes cargo to be transported to the UWIG, and causes the cargo loaded into UWIG storage compartments. Once loaded and the loaded UWIG is ready, the UWIG taxis, e.g., to the open sea. Environmentally sealed PAR thrust fans provide PAR thrust during takeoff. The UWIG flies to a delivery location where cargo is unloaded, and may be stored.

BRIEF DESCRIPTION OF THE DRAWINGS

The foregoing and other objects, aspects and advantages will be better understood from the following detailed description of a preferred embodiment of the invention with reference to the drawings, in which.

DESCRIPTION OF PREFERRED EMBODIMENTS

Figure 1:
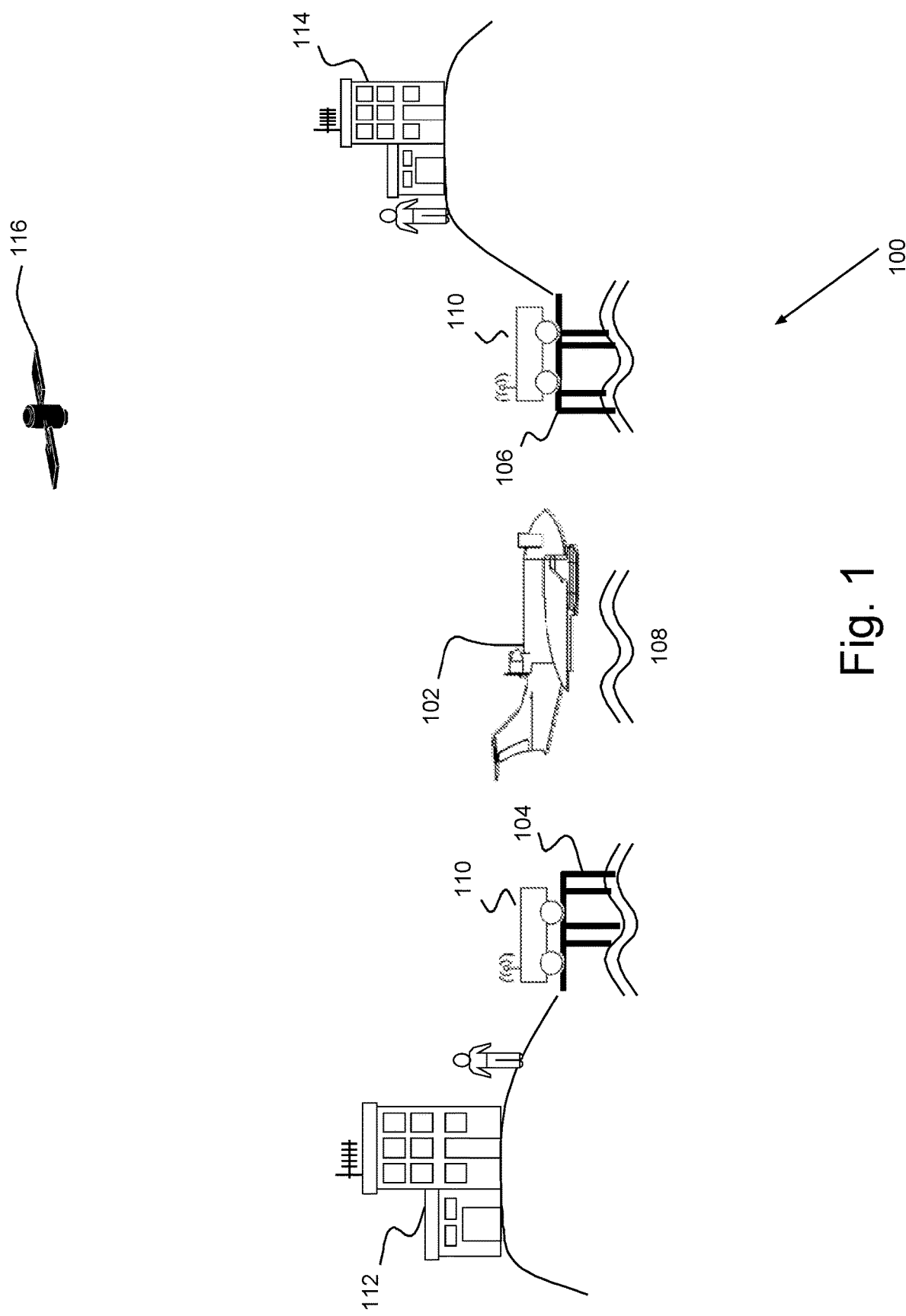
FIG. 1 shows an example of a preferred cargo transport and delivery system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Turning now to the drawings and more particularly, FIG. 1 shows an example of a preferred cargo transport and delivery system 100. Wing In Ground Effect (WIG) craft or vessels 102, particularly unmanned vessels (UWIGs), transport cargo over a waterway between a shipping station or port 104 and a delivery destination or port 106, pier to pier in this example. It should be noted that craft and vessel are used interchangeably herein unless indicated otherwise and UWIG refers to an unmanned WIG craft. The UWIGs 102 may be semi-autonomous (e.g., remotely operated) or, preferably, operates autonomously, flying above a body of water 108 at low altitude. Preferably also, the UWIG 102 employs Power Augmented Ram (PAR) thrust for low speed takeoff.

At each port 104, 106 cargo loaders 110 load or unload cargo (not shown), and move the cargo between the UWIGs 102 and a local terminal 112 or warehouse 114. Preferably, cargo loaders 110 move cargo in International Air Transport Association (IATA) standard unit load devices (LD or ULD), i.e., standard pallets or containers. The ports 104, 106 may include a standard floating pier for docking with loading and unloading interactive. Preferably however, ports 104, 106 are fitted for communicating with UWIG 102 control, whether autonomous or semi-autonomous, and adapted for increased efficiency with ramps and transfer elevators (not shown) adapted for full autonomy. Thus, the cargo loaders 110 may also be unmanned and operate autonomously or, preferably, semi-autonomously, communicate wirelessly with the local terminal 112 or warehouse 114, e.g., through WiFi or a cellular connection. Preferably also, the UWIG 102 has a distance wireless communications capability, e.g., through a cellular connection or by satellite 116.

WIG principles of flight are well known in the art and WIG craft operates under a peculiar aerodynamic phenomenon known as the ground effect. Ground effect occurs at a relatively low altitude where the distance between the wings of a craft and the surface beneath it causes an aerodynamic interaction between the wings and the surface. That aerodynamic interaction creates a cushion of high-pressure air beneath the craft that increases lift. So, a WIG craft, also called a Ground Effect Vehicle (GEV), operates at low altitude to take advantage of ground effect, essentially floating above the surface on the high-pressure air cushion.

Thus, a typical WIG vessel is a hybrid, part boat and part aircraft, piloted and co-piloted by humans. WIG designs are subject to a number of difficult issues that have discouraged widespread commercial adoption. A typical WIG vessel design is aircraft based and combines marine, aviation, wing, air cushion, aerodynamic and hydrodynamic theories in low altitude flight. The International Maritime Organization (IMO) categorizes WIG vessels as type A, B or C. Type A and B are classified and licensed as marine vessels and operate under IMO rules.

PAR thrust diverts exhaust gases, e.g., from jet engines or propeller slipstream, under the wings to allow takeoff at lower speeds than would otherwise be required. The exhaust gases from either the main engines or special assist engines accelerate air ducted, deflected or directed, to pass beneath the WIG wings and/or body, assisting in creating the air cushion.

The Russian Ekranoplan models KM and Lun, for example, only use PAR thrust during takeoff. The jet engines for these models are forward of the wing, deflecting the thrust downwards under the wings until the craft is airborne and at speed producing sufficient lift without the PAR thrust. The KM requires ten turbojets for sufficient takeoff power of which eight are dedicated for PAR thrust. After takeoff and in level flight, the PAR engines may be throttled back extensively or, alternately, some may be shut off. These PAR thrust engines added considerable additional weight to the craft, that consumes fuel even with the engines powered off. Further, during transoceanic travel the turbojets would ingest corrosive saltwater during takeoff and landing, that provided Ekranoplan operators with additional maintenance challenges.

Figure 2A:
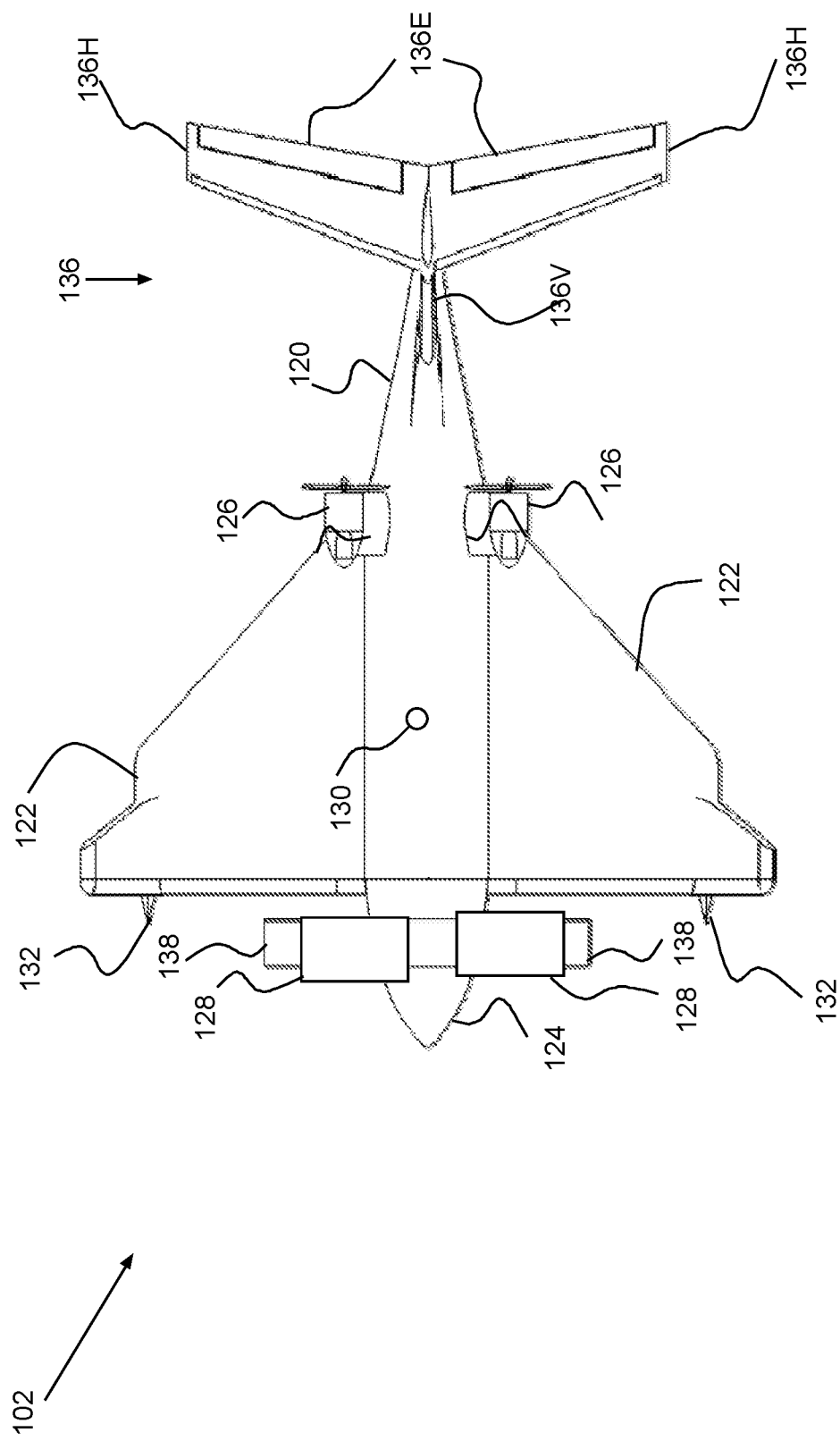
FIGS. 2A-C shows an example of a preferred UWIG in top, front and side views, respectively.
Figure 2B:
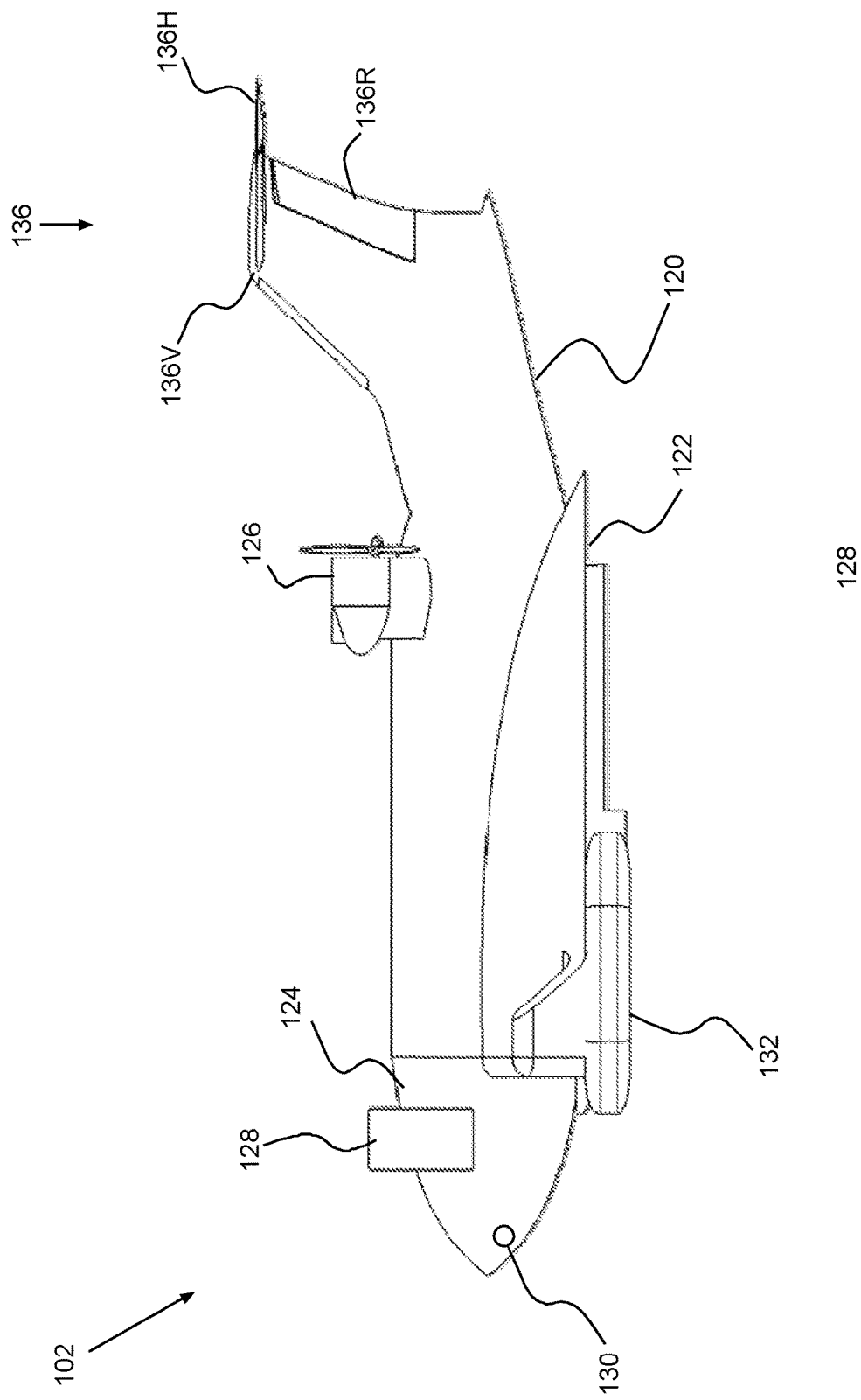
Figure 2C:
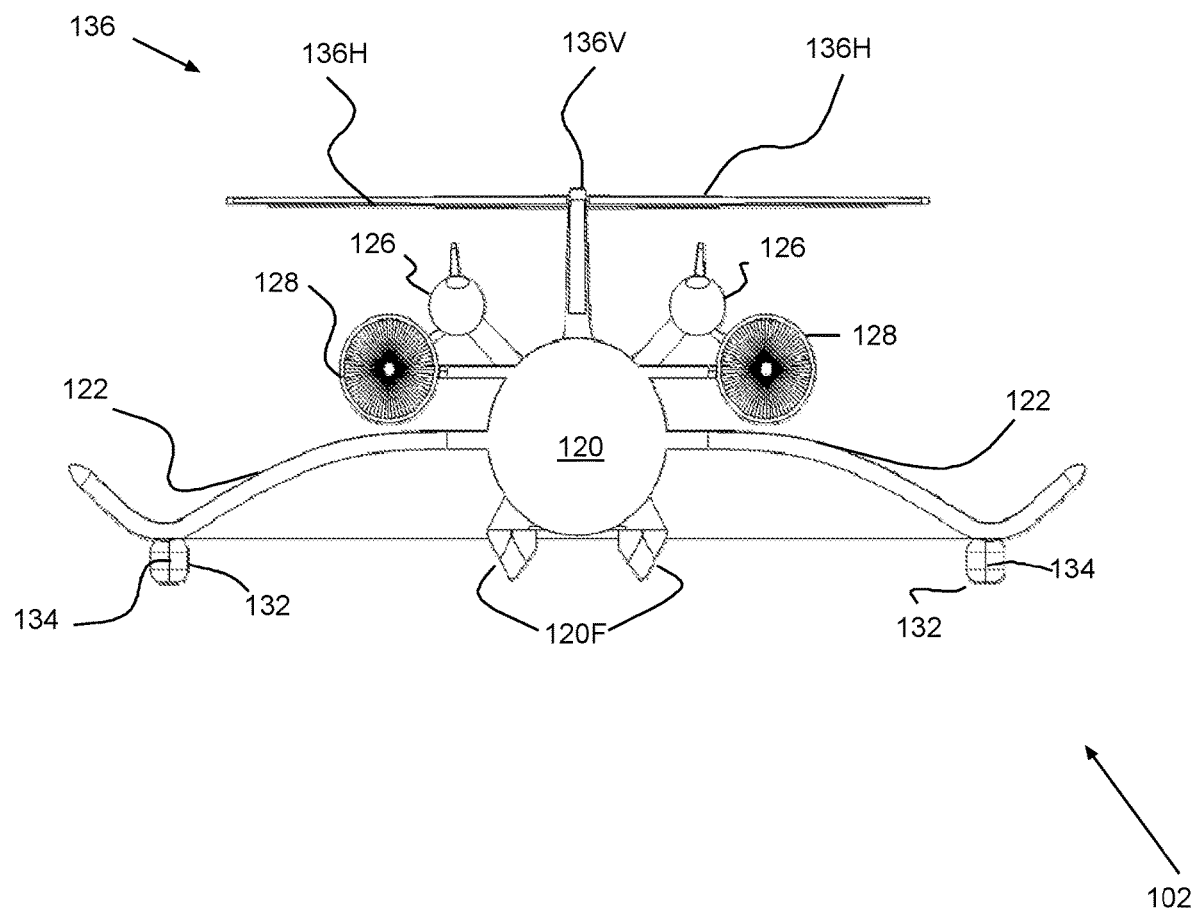

FIGS. 2A-C shows an example of a preferred UWIG 102 of FIG. 1 in top, front and side views, respectively. The preferred UWIG 102 is a multi-platform, fully or partially, autonomous craft with both surface and low altitude air capabilities. As a seaworthy maritime vessel, the UWIG 102 can taxi like a boat between a loading peer and the open sea. As a dynamic flight capable craft, the UWIG 102 can takeoff and fly at low altitude above the surface (below 492 feet (150 meters)) of a sea, a lake or a river. Thus, the preferred UWIG 102 is maritime capable, optimized for aerodynamics, stability and control, preferably with automatic sense and avoidance. Traveling at low altitude the UWIG 102 adheres to IMO Type B WIG classification, and is capable of following routes selected to optimize delivery times and for fuel efficiency.

Remotely controlled the UWIG 102 is a multi-platform drone. For long range travel, the UWIG 102 control may be over satellite 116 and/or ground based (e.g., cellular) communication. For example, the U.S. military regularly controls drone operations remotely, even half of the World away, using satellite communications. A preferred autonomous UWIG 102 also uses satellite communications and/or, where available, ground based communications connecting as frequently as practicable to forward travel progress and selectively forward telemetry data. In addition to autonomous in-transit (in-sea and in-air) operation, the preferred autonomous UWIG 102 navigates/operates autonomously around or above stationary objects and other stationary and mobile vessels, and loads and unloads autonomously. Preferably also, whether fully or partially autonomous or under remote control, the UWIG 102 operates free from any on-board human presence, pilot or otherwise, which eliminates the potential for any loss of human life from loss of the UWIG 102.

The preferred UWIG 102 includes, e.g., a 65-70' (18-22 m) long floating fuselage 120 with a 10' (3 m) beam, and two (2) 20' (6 m) gull wings or, in this example, aerodynamically reverse delta scooping wings 122 for 50' (15 m) wingspan. The fuselage 120 has several operational modes including an amphibian mode, a displacement mode, a transitional mode, a planing mode, a takeoff/landing mode, a ground effect mode and a fly-over mode. For added buoyancy the floating fuselage 120 may be supplemented with a pair of floats 120F.

In amphibian mode the UWIG 102 is supported mainly by a static air cushion and moves slowly above a surface other than water, e.g., over ice, a sandy beach, sand bars or marshland. In displacement mode, whether at rest or in motion, the weight of the UWIG 102 is fully or predominantly supported hydrostatically, typically while taxiing. In transitional mode the UWIG 102 transitions between displacement mode and planing mode. In planing mode the UWIG 102 is hydroplaning in steady state, supported mainly hydro-dynamically on the surface of a body of water. Takeoff/landing mode is the transient mode between planing mode and ground effect mode. Ground effect mode is steady state low altitude flight. The UWIG 102 can enter fly-over mode to avoid surface obstacles, increasing altitude slightly for a limited period, while maintaining a minimal safe altitude within maritime regulations.

The fuselage 120 is capable of holding cargo, e.g., loaded through cargo hold door(s) 124, a bow/nose hatch in this example. Fully loaded and in the water, the fuselage 120 keel (not shown) may rest on a firm surface, e.g., a harbor or river bottom, or when floating the draft is such that the wings 122 are at or above the water surface. Two (2) rear mounted propellers 126 may be driven by one or more standard gas engine (not shown), e.g., a standard marine, automobile or light truck engine. Two (2) forward mounted, lightweight fans 128 driven by one or more heavy duty electric motor (not shown), provide hybrid-electric PAR thrust during takeoff and, if necessary, landing and during flight. The preferred heavy duty electric motor is a 762 horsepower (762 HP), 568 kilowatt (568 kW) variable speed motor. Preferably, the gas engine(s) powering the rear propellers 126 also generates sufficient electricity to serve as a power source for the electric motor driving thrust-assist fans 128, and serves as a charger for the 100 kWh battery/battery pack. Sensors 130 distributed about the vessel 102 sense environmental conditions and activity, e.g., wave activity, nearby airborne and marine activity and ambient weather related activity. Sensor data passes to one or more on board controller computer guiding, or assisting guiding, the UWIG 102, as well as providing periodic progress and status.

Attached to each wing 122 outboard pontoons 132 provide stability in the water and may include underwater fan thrusters 134. Preferably, the underwater fan thrusters 134 are variable speed, 54 kW electric motor driven (73 hp @6,300 rpm), water-sealed, 5.75' (260 mm) axial flow, single stage, ducted fans. Optionally, the fan thrusters 134 may be shaft driven from the engine(s). Primarily, the underwater fan thrusters 134 provide short range movement for positioning the UWIG 102 in port, e.g., while taxiing and docking or undocking.

UWIG empennage 136 includes vertical and horizontal stabilizers 136V, 136H, two elevators 136E and a rudder 136R. The on-board controller computer(s) translate detected wave height amplitude into pneumatic, hydraulic, electromechanical action to control actuators and servos steering the UWIG 102. Preferably, the UWIG 102 is capable of low altitude flight, i.e., 30-300' (9-90 m) above the surface, coupled with medium to long range trip capability for delivering goods to/from ports, ships, beaches or boat ramps. So, depending on payload and weather a preferred UWIG 102 has a delivery range, up to one thousand kilometers (1000 Km).

Thrust-assist fans 128 are environmentally sealed and provide PAR thrust for an alternate thrusting force to lift UWIG 102, especially in takeoff. Because the thrust-assist fans 128 are environmentally sealed, the electric motors do not ingest saltwater, protecting sensitive motor components from corrosive saltwater.

In this example, the thrust-assist fans 128 are mounted on canards 138 attached to the fuselage 120. Optionally, the canards are positionable, e.g., articulating, rotatable or otherwise positionable, for an extra lifting surface during take-off and landing. Alternately, the canards 138 can be fixed, mounted parallel to airflow (with the wings 122) with the thrust-assist fans 128 selectively articulating independently to supply PAR thrust airflow under the wings 122.

Figure 3:
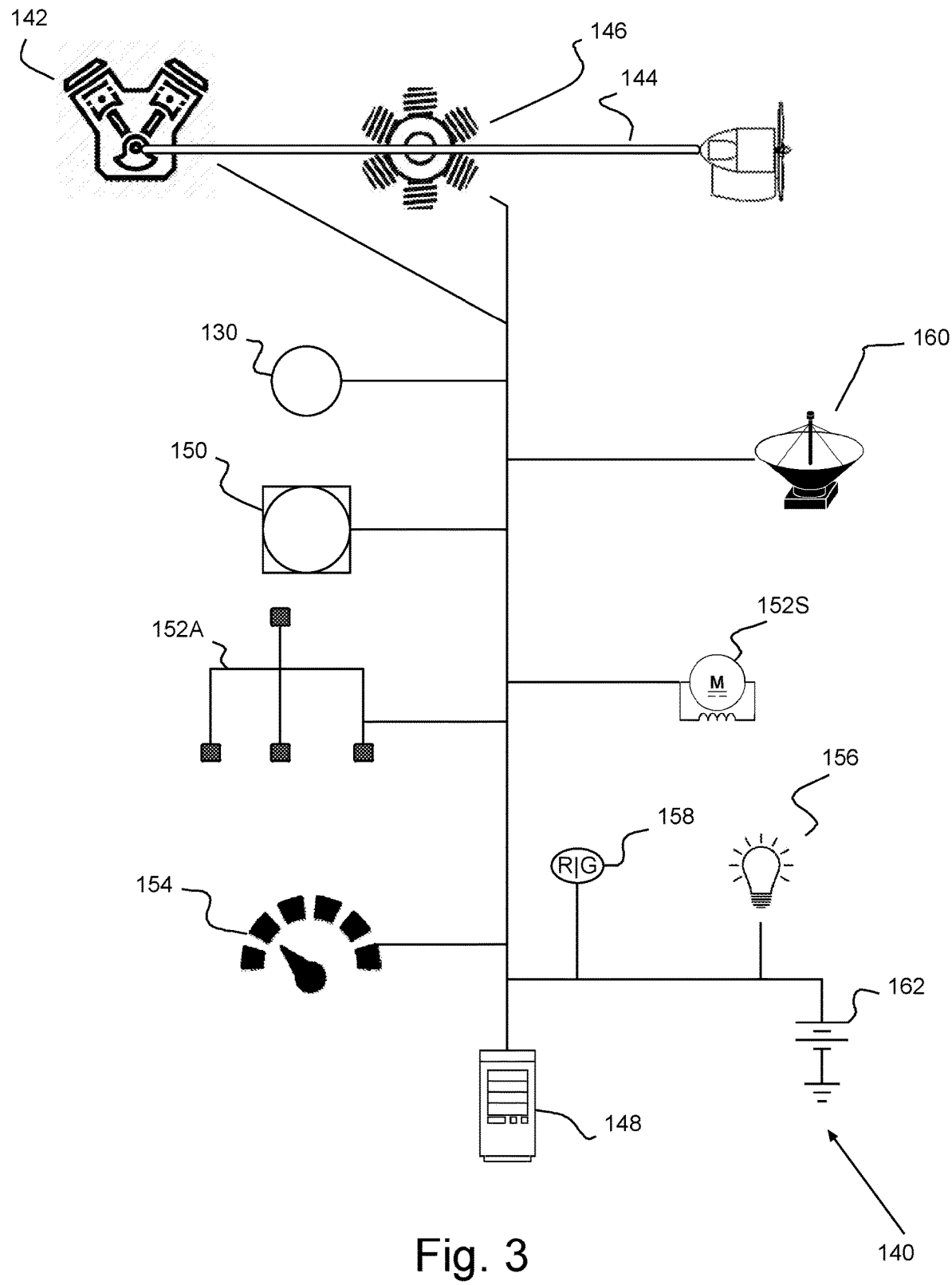
FIG. 3 shows an example of the power and control system for a preferred UWIG.

FIG. 3 shows an example of the power and control system 140 for a preferred UWIG, e.g., 102 in FIGS. 1 and 2A-C. One or more gas engine(s) 142, preferably two, rear mounted high performance marine, car or truck engines, drive main propellers (126 in FIG. 2) and torque a shaft 144 driving the on-board electric power source, a magneto-electric generator, such as typical automotive alternator 146 in this example. Preferably, each of the gas engines 142 are commercially available engines capable of providing up to five hundred horsepower (500 Hp). Optionally, a separate gas generator (not shown) may be internally mounted for charging batteries even when the gas engine(s) 142 are shut down.

The generator 146 supplies power for the PAR thrust-assist fan 128 motor(s), subsurface fan thrusters 134, the on-board controller computer(s) 148 and, where necessary, any other on board electrical equipment, e.g., sensors 130, cameras 150, pneumatic or electric actuators 152A and servos 152S, navigational electronics 154, beacons 156, running lights 158, one or more terrestrial or satellite 116 transponders, e.g., cell or satellite phone based, and provides a charger for auxiliary 100 kWh power storage batteries/battery pack 162.

The controller, e.g., computer(s) 148, manages the on board electrical equipment, autonomously or semi-autonomously, to control all aspects of UWIG 102 operation to stabilize the UWIG 102, including controlling roll, flight trim, pitch, yaw and heave, heading and altitude. Although shown here as a single computer 148, it is understood that control may be distributed to multiple on-board computers for redundancy and/or for cooperatively controlling different aspects of operation, e.g., loading and unloading, flight and taxiing.

The controller 148 uses sensor 130 data to detect, preferably using adaptive learning, ambient conditions for approximating a minimum flight trajectory and flight course. The controller 148 controls actuators 152A that control: fuel supplied to the gas engine(s) 142 driving main propellers 126, vary the stabilizers 136V, 136H, the elevators 136E, the rudder 136R and operate the thrust-assist fan 128 motors. The thrust-assist fans 128 provide the pressure differential beneath the wings 122 that creates the PAR air cushion facilitating take-off. The thrust-assist fans 128 may also provide additional pitch, yaw, and roll support during flight.

Between flights, in the water, the controller 148 also controls the electrically powered underwater fan thrusters 134, e.g., for taxiing in and out of port and docking. While docked, the controller 148 normally powers down everything except at least one transponder 160. The transponder 160 waits for a wake-up call that signals to begin preparation for the next delivery.

Figure 4A:
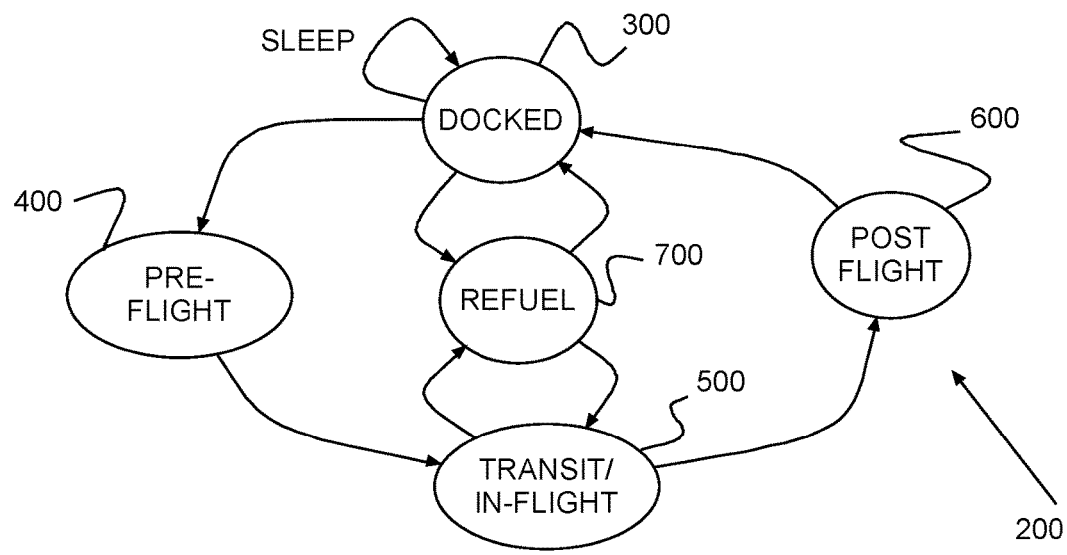
FIGS. 4A-B show an example of operating states in operation of a preferred UWIG.
Figure 4B:
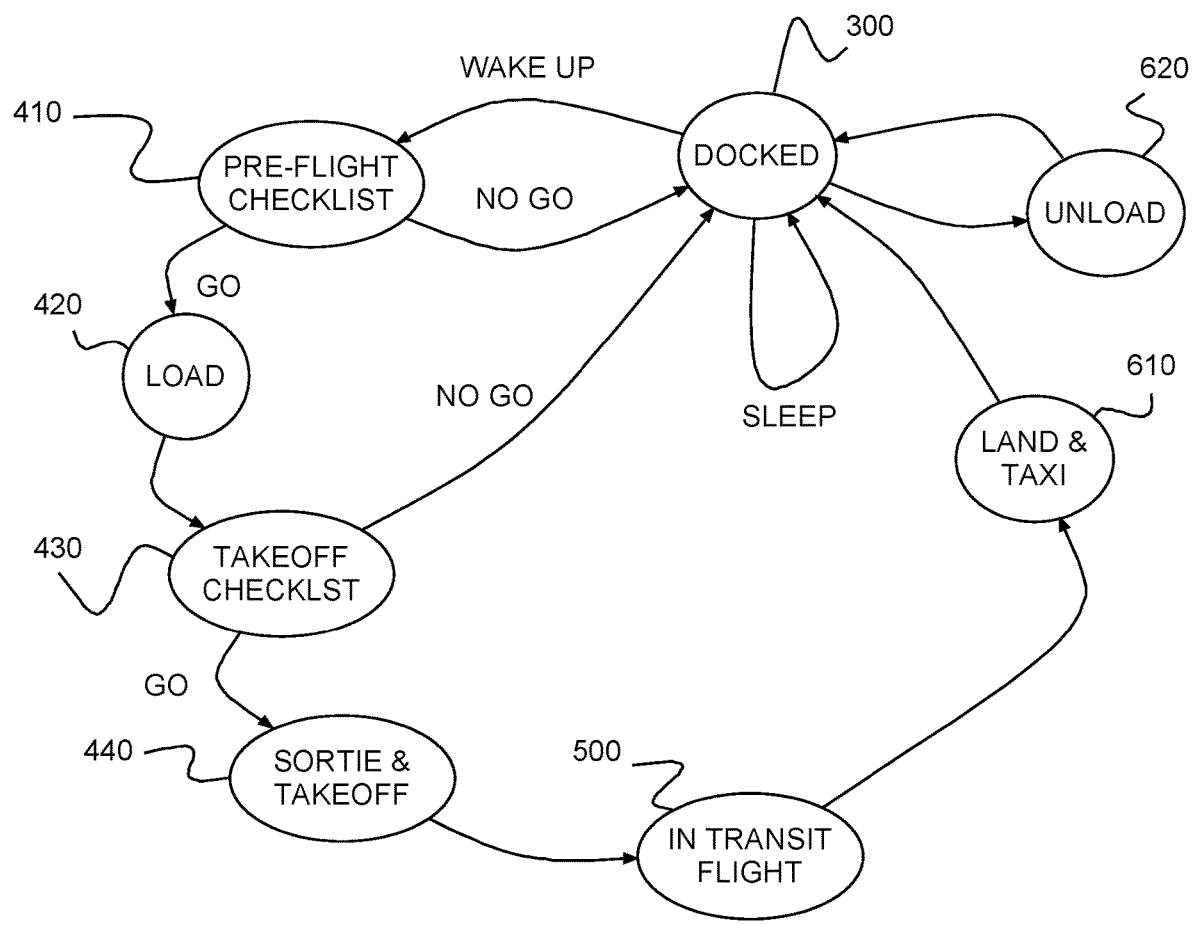

FIGS. 4A-B show an example of operating states in operation 200 of a preferred UWIG, e.g., 102 with reference to the preferred system 100 of FIG. 1. Preferably, there are four primary states that include in addition to docked 300, pre-flight 400, in-flight 500 and post flight 600. Also, the UWIG 102 can refuel 700 at any time, as needed. The UWIG 102 typically refuels 700 while in-port 104, 106, e.g., docked 300, or after being diverted, planned or unplanned, during flight 500.

Pre-flight 400 includes a pre-flight checklist state 410, a cargo load state 420, a takeoff checklist state 430 and an on-surface navigation state 440, taxiing to a takeoff location, e.g., sortieing a harbor or bay. A delivery can be aborted at any time, especially pre-flight 400, and as described in more detail hereinbelow. Aborting causes the UWIG 102 to remain, or return to, docked 300, e.g., for needed servicing. Post flight 600 includes landing and on-surface navigation 610, e.g., taxiing a harbor or bay at a destination, and unloading 620. Unloading 620 can be done when and where the UWIG 102 moors, or at a pre-determined unloading station, prior to docking 300.

Figure 5A:
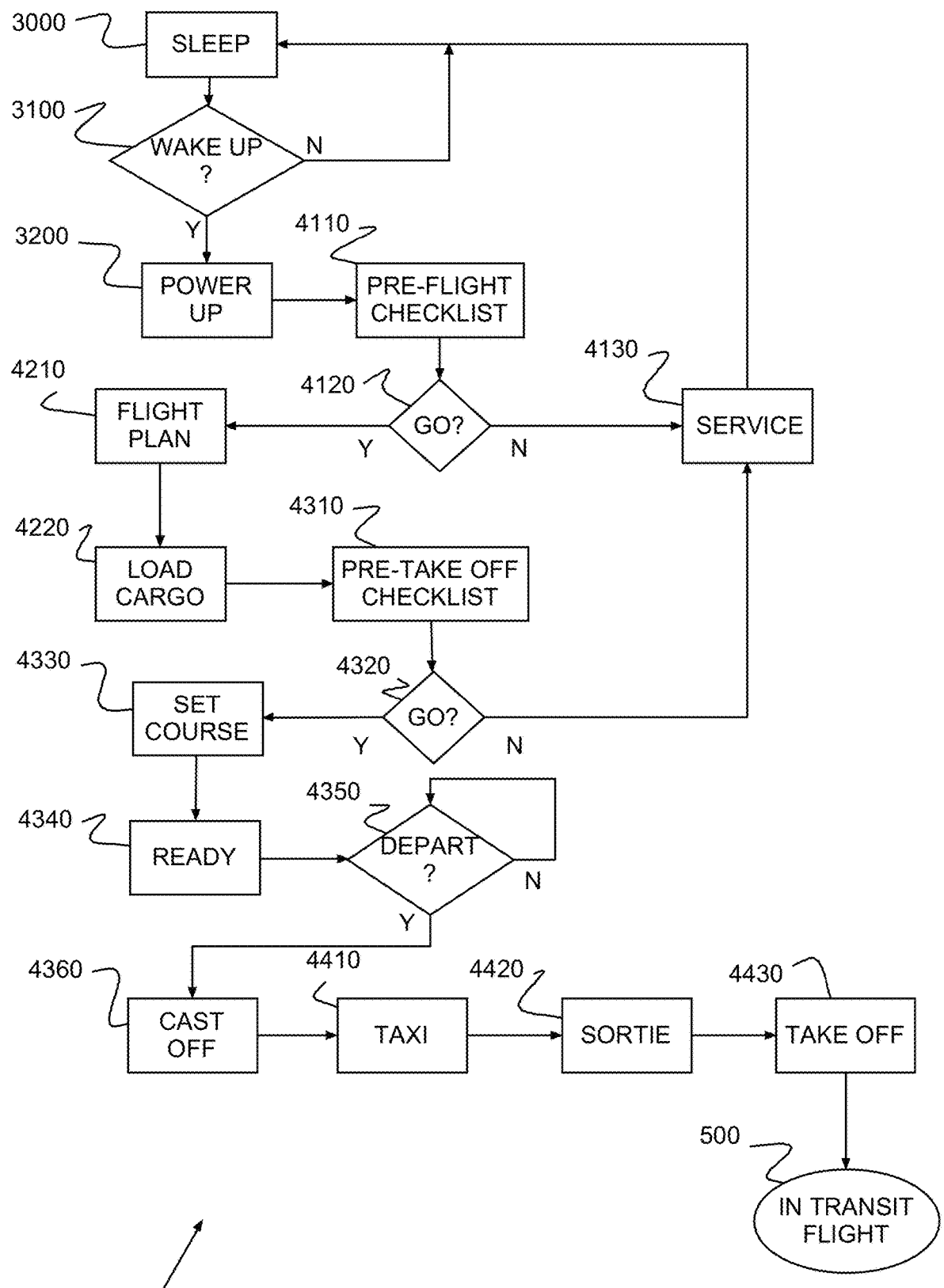
FIGS. 5A-B show operation of a preferred system from start of a new shipment through takeoff, in-transit through delivery at the shipping destination.
Figure 5B:
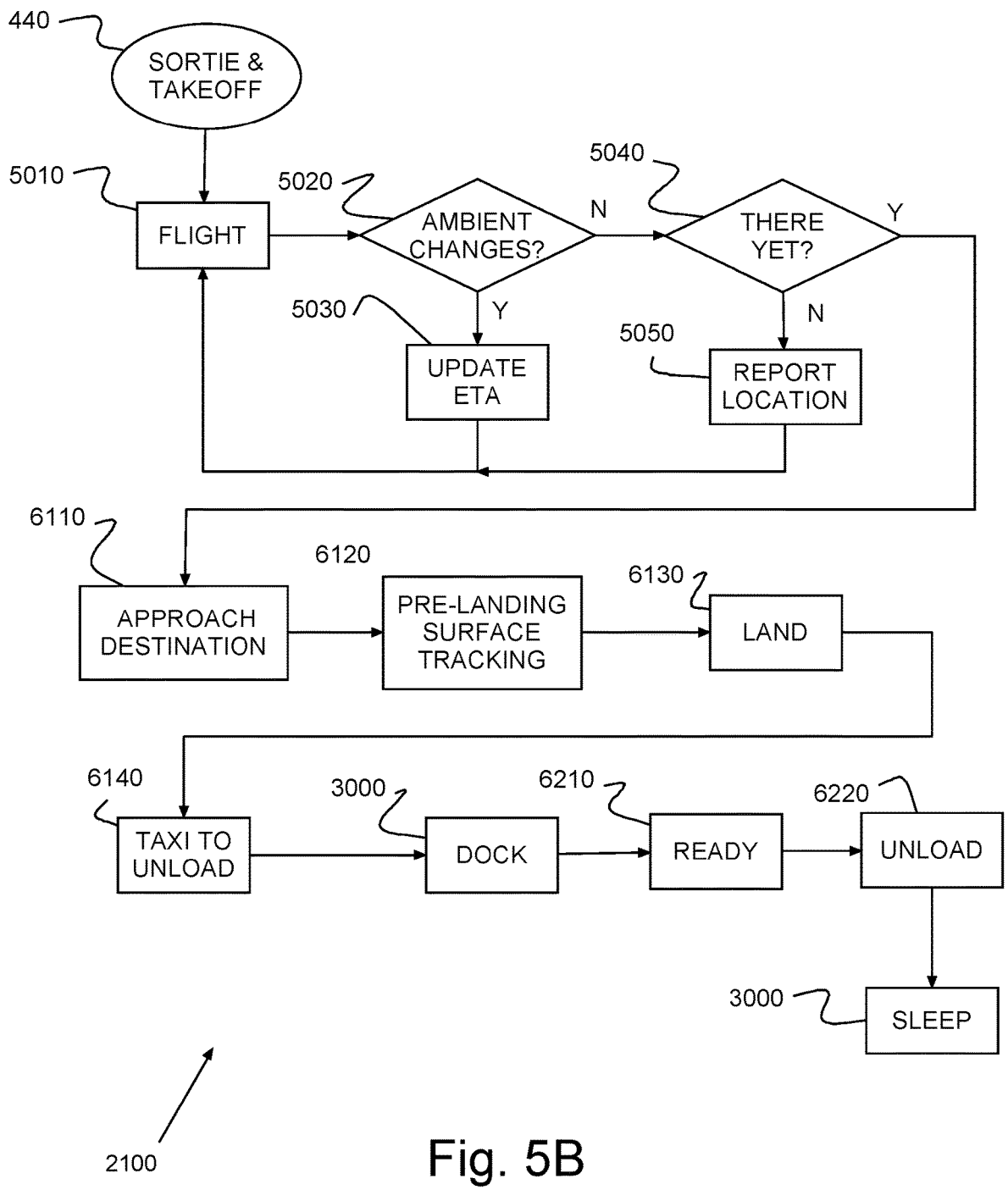

FIGS. 5A-B show operation of a preferred system (100 in FIG. 1) from start of a new shipment through takeoff 2000, in-transit through delivery at the shipping destination 2100, with reference to FIGS. 4A-B. Docked 300 the UWIG 102 is moored at either port 104, 106, between deliveries with most electronics in sleep mode 3000, powered down or off. A wake up signal 3100 to transponder, e.g., 160 in FIG. 3, initiates a full or partial power up 3200 and the UWIG 102 enters pre-flight mode 400 for a new delivery.

In pre-flight mode 400 the controller 148 first conducts 410 a pre-flight checklist 4110 to determine 4120 whether the UWIG 102 is a go or no go for a new delivery. If the pre-flight checklist 4110 run through is unsuccessful, the UWIG 102 returns 4120 a no go signal indicating that service may be required, returns to sleep mode 3000, and may, for example, signal or schedule 4130 necessary maintenance/repair.

However, if the UWIG 102 passes the pre-flight checklist 4110, the controller 148 returns 4120 a go signal through transponder 160, and downloads a flight plan 4210. Optionally, the controller 148 may also download any available system updates/upgrades. The go signal also initiates a cargo load 4220. Loading 4220 may be partially or fully manned or, preferably, autonomously controlled, e.g., using a logistic subsystem such as the integrated Mendelssohn Freight Services (MFS) delivery system. The preferred logistic subsystem interacts with controller 148 in positioning port ramps and transfer elevators, as well as managing UWIG 102 loading operations. A preferred logistic subsystem includes a real-time operational mapping and tracking facility capable of informing clients of cargo loader 110 and/or UWIG 102 location and loading state in real time.

Preferably, cargo is pre-loaded in pods on cargo loaders 110, e.g., LD's fitted for the UWIG 102. The port 104 is responsible for pre-loading cargo into the LDs and transporting the pods to the docked UWIG 102. Once at the dock and, for example, loaded onto a conveyor (not shown), the controller 148 may take over loading 4220, opening cargo door 124, positioning and locking the LDs into position. Once all LDs are loaded and locked into position, loading 4220 is complete and the controller 148 closes cargo door 124.

After closing cargo door 124, the controller 148 runs a take-off checklist 4310 on the UWIG 102. Again, if the take-off checklist 4310 run through is unsuccessful, the delivery is a no go 4320. The UWIG 102 returns to the docked state 300 and may signal or schedule 4130 required service. Otherwise, delivery is a go 4320 and the controller 148 sets the flight course 4330. The controller 148 signals 4340 readiness to unlock UWIG 102 from the dock, e.g., to the port harbormaster. When the port returns an OK to depart signal 4350, the UWIG 102 casts off 4360.

Next, following appropriate maritime rules the floating UWIG 102 taxis 4410 for takeoff, e.g., from the shipping station pier 104 and, sorties 4420 the harbor for a clear takeoff. The controller 148 may use PAR thrusters 128 and/or underwater fans 138 to maneuver the UWIG 102 through taxi traffic. Then, after sortieing the harbor, the UWIG 102 taxis to a take-off location 4430, preferably away for designated shipping lanes and under power from the main propellers 126.

Once at the takeoff location 4430, e.g., in the open sea, the controller 148 tracks a clear takeoff path for a takeoff distance based on, e.g., wave height, traffic distance prediction, wind speed and direction, payload weight, center of gravity (CG) and obstacle avoidance. The UWIG 102 activates PAR thrust and increases speed to takeoff 4430, and begins low altitude flight 5010 to its delivery destination.

In-flight 5010 the controller 148 collects and uses real-time telemetry data on flight speed and forward wave height to set UWIG 102 altitude and control pitch and yaw. In the air the UWIG 102 cruises at low altitude and on the surface operates as a maritime vessel. Thus, each delivery may follow, but is not restricted to follow, existing shipping lanes. Moreover, the controller 148 has a marine autopilot capability, and can auto redirect the UWIG 102 when necessary, to avoid inclement weather or collisions with other, traditional maritime vessels of all sizes. For example, the Garmin solid-state 9-axis Attitude Heading Reference System (AHRS), the GHP Reactor™ autopilot series is suitable for facilitating the controller 148 in holding course, even while pitching and rolling in rough water. This marine autopilot capability also reduces heading errors, course deviations, and rudder movement, while minimizing power consumption.

In transit the flight conditions may change 5020. The controller 148 selectively updates 5030 the estimated time of arrival (ETA). The controller 148 tracks and periodically 5040 relays ship position 5050, e.g., for emergency UWIG 102 and cargo recovery. Also, depending on the ETA, distance to the delivery destination, payload and real-time UWIG 102 range capability, the controller 148 may divert the flight for refueling 700, as necessary.

Upon arriving at the delivery destination 5040, post flight 600, the UWIG 102 approaches 6110 a landing location in open water, e.g., near a harbor entrance. Still in open sea the controller 148 again tracks a clear landing path 6120 and unassisted or under remote control, lands 6130 the UWIG 102. Once floating on the surface, the UWIG 102 taxis 6140 to an unloading pier, e.g., to dock 300 at destination pier 106. Thus, a preferred autonomous UWIG 102 is capable of navigating a busy port location, targeting a loading pier and docking 300 itself in position.

After docking 300 the UWIG 102 initiates a cargo unload 620, substantially in reverse of the cargo load 420. The controller 148 communicates a cargo ready signal 6210 to the port indicating arrival, and preferably, also indicates fuel level, system status, power levels and any faults and/or damage incurred during the delivery trip. After unloading 6220 cargo, the UWIG 102 may refuel 700 and/or begin the next shipment by downloading new flight instructions, or return to sleep mode 3000 to wait for a wakeup signal or service. Alternately, the UWIG 102 may return to its originating port 104 and refueling 700 may be postponed until the next wake up.

Advantageously, a preferred cargo transport and delivery system minimizes the potential for any loss of life and is free of expensive infrastructure requirements, such as a runway or shipping facilities. This requirement flexibility makes fitting any port for loading and unloading a UWIG relatively cheap and quick. Takeoff and landing are directly from the open sea, for example, providing an unlimited length runway accelerating to speed, even with a heavy cargo and full fuel load. Any open seaway can serve as an emergency landing "strip." The preferred UWIG is pilotless and passenger free. Thus, even if the UWIG and any cargo are completely destroyed or lost at sea during transit, e.g., the UWIG sinks after an emergency landing, there is only a property loss, i.e., the UWIG and cargo.

Moreover, a preferred UWIG travels nearly unrestricted, able to avoid roads interrupted by traffic lights, or congestion from accidents and construction. Nor is a preferred UWIG restricted to flying traditional air routes in airspace that is subject to governmental air traffic regulations. Instead, traveling at low altitude (below 492 feet) in adherence to the IMO Type B WIG classification, the UWIG can use routes selected to optimize delivery times and fuel efficiency. In ground effect the air the preferred UWIG flies an order of magnitude faster than a ship with little or no wake. So speed is not restricted by surface restrictions, such as in no-wake zones.

Sealed electric PAR motors avoid ingesting saltwater. So, sensitive PAR motors components are not exposed to corrosive saltwater, which has plagued the Ekranoplan turbines. Since the UWIG preferred flight engine(s) runs on low cost maritime fuel instead of higher cost aviation fuel, cargo transportation by the preferred cargo transport and delivery system provides a considerable cost savings. The preferred Type B UWIG can quickly climb to a sufficient altitude, e.g., a couple of hundred feet (but below 492'), to avoid slower moving surface vessels or stationary obstacles (e.g., bridges), even when unexpected.

Further, as a multi-platform vehicle, in the air the UWIG is free of draft depth limitations, does not run aground and avoids injuring/destroying aquatic life. Thus, a preferred UWIG can travel freely over frozen bodies of water or shallow areas, e.g., shorelines, beach/sand bars, tides, river rapids, reefs, floating debris, icebergs or subsurface mines. Nor do underwater currents affect cruising speed, navigation and performance, even in rough seas.

While the invention has been described in terms of preferred embodiments, those skilled in the art will recognize that the invention can be practiced with modification within the spirit and scope of the appended claims. It is intended that all such variations and modifications fall within the scope of the appended claims. Examples and drawings are, accordingly, to be regarded as illustrative rather than restrictive.

What is claimed is:

1. A cargo transport system comprising:
   at least one unmanned Wing In Ground Effect vessel (UWIG) with one or more cargo storage compartments and having modes of operation, said modes of operation comprising:
   an amphibian mode, wherein said at least one UWIG is supported by a static air cushion and moves above a surface other than water,
   a displacement mode, wherein the weight of said at least one UWIG is supported hydrostatically, and
   a ground effect mode, wherein said at least one UWIG flies steady state in ground effect;
   said at least one UWIG including a wireless communications transceiver, messages to said wireless communications transceiver selectively indicating assignment of a new cargo shipment to said at least one UWIG, and initiating transporting said new cargo;
   an origination port with docking space for, and selectively communicating with, said at least one UWIG;
   a destination port with docking space for, and selectively communicating with, said at least one UWIG, at least one of the origination port docking space and the destination port docking space being at a shipping pier, said at least one UWIG transporting cargo between said origination port and said destination port; and
   remote controlled (RC) cargo loaders transporting cargo between said at least one UWIG and local storage at each of said origination port and said destination port, said at least one UWIG wirelessly providing RC to respective said cargo loaders during loading and unloading.

2. A cargo transport system as in claim 1, wherein said at least one UWIG is remote controlled (RC), RC being provided wirelessly through said wireless communications transceiver.

3. A cargo transport system as in claim 1, wherein said at least one UWIG is fully autonomous, said at least one UWIG providing progress updates wirelessly through said wireless communications transceiver.

* * * * *